United States Patent [19]

George et al.

[11] Patent Number: 5,369,211
[45] Date of Patent: Nov. 29, 1994

[54] WATER-DISPERSIBLE SULFO-POLYESTER COMPOSTIONS HAVING A TG OF GREATER THAN 89°C.

[75] Inventors: Scott E. George; Donna L. Jordan; Bobby J. Sublett, all of Kingsport, Tenn.

[73] Assignee: Eastman Chemical Company, Kingsport, Tenn.

[21] Appl. No.: 182,466

[22] Filed: Jan. 18, 1994

Related U.S. Application Data

[63] Continuation of Ser. No. 41,105, Apr. 1, 1993, abandoned.

[51] Int. Cl.$^5$ .......................................... C08G 63/688
[52] U.S. Cl. ..................... 528/293; 528/272; 528/275; 528/286; 528/295; 528/298; 528/302; 528/307; 528/308; 524/706; 524/711; 524/773; 524/777; 524/787
[58] Field of Search ............... 528/272, 275, 286, 293, 528/295, 298, 302, 307, 308; 524/706, 711, 773, 777, 787

[56] References Cited

U.S. PATENT DOCUMENTS

| | | | |
|---|---|---|---|
| 3,018,272 | 1/1962 | Griffing et al. | 528/293 |
| 3,546,008 | 12/1970 | Shields et al. | 428/395 |
| 3,563,942 | 2/1971 | Helberger | 524/602 |
| 3,734,874 | 5/1973 | Kibler | 524/603 |
| 3,779,993 | 12/1973 | Kibler et al. | 528/295 |
| 3,828,010 | 8/1974 | Davis | 528/288 |
| 4,480,085 | 10/1984 | Larson | 528/295 |

Primary Examiner—Samuel A. Acquah
Attorney, Agent, or Firm—John D. Thallemer

[57] ABSTRACT

The present invention relates to sulfonate containing water-dispersible or water-dissipatible sulfo-polyester compositions. The sulfo-polyesters of the present invention have a glass transition temperature of greater than 89° C. In addition, the sulfo-polyesters have a dicarboxylic acid component of poly(ethylene-2,6-naphthalene dicarboxylate and a sulfo-monomer, and a diol component of at least 35 mole percent of a diol selected from ethylene glycol, 1,4-cyclohexanedimethanol, propane-1,2-diol and 2,2-dimethyl-1,3-propanediol. The sulfo-polyesters of this invention are useful in applications where increased abrasion resistance, inherent higher temperature process conditions, and improved blocking resistance are required such as in adhesives, coating materials, sizes, laminated products, aqueous printing inks, and films.

7 Claims, No Drawings

WATER-DISPERSIBLE SULFO-POLYESTER COMPOSTIONS HAVING A TG OF GREATER THAN 89°C.

This is a continuation of copending application Ser. No. 08/041,105, filed on Apr. 1, 1993, now abandoned.

FIELD OF THE INVENTION

The present invention relates to sulfonate containing water-dispersible or water-dissipatible sulfo-polyester compositions. The sulfo-polyesters of the present invention have a glass transition temperature of greater than 89° C. In addition, the sulfo-polyesters have a dicarboxylic acid component of poly(ethylene-2,6-naphthalene dicarboxylate and a sulfo-monomer, and a diol component of at least 35 mole percent of a diol selected from ethylene glycol, diethylene glycol, 1,4-cyclohexanedimethanol, propane-1,2-diol and 2,2-dimethyl-1,3-propanediol. The sulfo-polyesters of this invention are useful in applications where increased abrasion resistance, inherent higher temperature process conditions, and improved blocking resistance are required such as in adhesives, coating materials, sizes, laminated products, aqueous printing inks, and films.

BACKGROUND OF THE INVENTION

Poly(ethylene-2,6-naphthalene dicarboxylate), referred to as PEN, has been used in films, fibers, and molded objects. U.S. Pat. Nos. 3,546,008, 3,563,942, 3,734,874, 3,779,993 and 3,828,010 disclose water-dispersible copolyester and polyesteramide compositions containing metal sulfonate groups. The Tg of the polyesters is 29°–55° C. U.S. Pat. No. 4,480,085, discloses compositions containing at least 35 mole % of an orthophthalic acid, based on total dicarboxylic acid content. In U.S. Pat. No. 4,480,085, 1,8-naphthalene dicarboxylic acid and sodiosulfoisophthalic acid were used as the dicarboxylic acid component in combination with ethylene glycol and the polyester had a Tg of 73° C. It is well known in the art, however, that increasing the glass transition temperature of such polyesters reduces the water-dispersibility of the polyesters.

In contrast, the present inventors have unexpectedly determined that water-dispersible sulfo-polyesters having a glass transition temperature of greater than 89° C. can be prepared. The sulfo-polyesters of the present invention have a dicarboxylic acid component of poly-(ethylene-2,6-naphthalene dicarboxylate and a sulfo-monomer, and a diol component of at least 35 mole percent of a diol selected from ethylene glycol, diethylene glycol, 1,4-cyclohexanedimethanol, propane-1,2-diol and 2,2-dimethyl-1,3-propanediol.

SUMMARY OF THE INVENTION

Accordingly, it is one object of the present invention to provide a water-dispersible sulfo-polyester composition.

Accordingly, it is another object of the invention to provide a water-dispersible sulfo-polyester having a Tg of greater than 89° C. which is useful in applications where increased abrasion resistance, inherent higher temperature process conditions, and improved blocking resistance are required.

These and other objects are accomplished herein by a water-dispersible sulfo-polyester having a Tg of greater than 89° C. consisting essentially of repeat units from:

(a) naphthalene dicarboxylic acid or naphthalene dicarboxylate ester;
(b) at least 35 mole percent of a diol selected from the group consisting of ethylene glycol, 1,4-cyclohexanedimethanol, propane-1,2-diol, 2,2-dimethyl-1,3-propanediol and mixtures thereof; and
(c) a difunctional sulfomonomer containing at least one sulfonate group attached to an aromatic nucleus wherein the functional groups are hydroxy, carboxy or amino, provided the difunctional sulfomonomer is present in an amount from 5 to 40 mole percent based on 100 mole percent dicarboxylic acid and 100 mole percent diol.

DESCRIPTION OF THE INVENTION

This invention discloses compositions and methods of preparation for linear, water-dispersible sulfo-polyesters having a Tg value of at least 89° C. The term "water-dispersible" is used interchangeably with other descriptors such as "water-dissipatible", "water-soluble", or "water-dispellable". All of these terms refer to the activity of water or a mixture of water with a water-miscible organic solvent on the sulfo-polyesters described herein. This terminology includes conditions where the sulfo-polyester is dissolved to form a true solution or is dispersed within an aqueous medium. Due to the statistical nature of polyester compositions, it is possible to have soluble and dispersible fractions when a single polyester is acted upon by an aqueous medium.

The sulfo-polyester contains repeat units from a dicarboxylic acid and a difunctional sulfomonomer, and a diol. Dicarboxylic acids useful in the present invention include naphthalene dicarboxylic acid or naphthalene dicarboxylate ester such as naphthalene-2,6-dicarboxylic acid. The naphthalene dicarboxylate monomer may be in the form of the free-acid or esterified derivatives thereof. Preferably, the dimethyl ester forms are used which have the following structures:

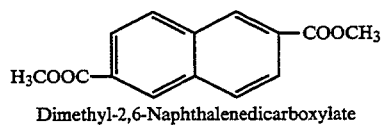

Dimethyl-2,6-Naphthalenedicarboxylate

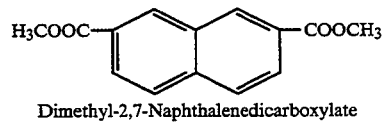

Dimethyl-2,7-Naphthalenedicarboxylate

Isomeric arrangement of the carboxylate groups on the naphthalene substrate is an important consideration to the practice of this invention. High Tg polyester resins are readily obtained when each of the aromatic rings bears one of the carboxyl(ate) groups.

The difunctional sulfomonomer component of the polyester may be a dicarboxylic acid or an ester thereof containing a metal sulfonate group (—SO$_3^-$), a diol containing a metal sulfonate group, or a hydroxy acid containing a metal sulfonate group. Suitable metal cations of the sulfonate salt may be Na$^+$, Li$^+$, K$^+$, Mg$^{++}$, Ca$^{++}$, Ni$^{++}$, Fe$^{++}$, Fe$^{+++}$, Zn$^{++}$ and substituted ammonium. The term "substituted ammonium" refers to ammonium substituted with an alkyl or hydroxy alkyl radical having 1 to 4 carbon atoms. It is within the scope of this invention that the sulfonate salt is non-metallic and can be a nitrogenous base as described in U.S.

Pat. No. 4,304,901 which is incorporated herein by reference.

The choice of cation will influence the water-dispersibility of the resulting polyester. Monovalent alkali metal ions yield polyesters that are less readily dissipated by cold water and more readily dissipated by hot water, while divalent and trivalent metal ions result in polyesters that are not ordinarily easily dissipated by cold water but are more readily dispersed in hot water. Depending on the end use of the polymer, either of the different sets of properties may be desirable. It is possible to prepare the sulfo-polyester using, for example, a sodium sulfonate salt and later by ion-exchange replace this ion with a different ion, for example, calcium, and thus alter the characteristics of the polymer. In general, this procedure is superior to preparing the polymer with divalent salts inasmuch as the sodium salts are usually more soluble in the polymer manufacturing components than are the divalent metal salts. Polymers containing divalent and trivalent metal ions are normally less elastic and rubber-like than polymers containing monovalent ions.

The difunctional sulfomonomer contains at least one sulfonate group attached to an aromatic nucleus wherein the functional groups are hydroxy, carboxy or amino. Advantageous difunctional sulfomonomer components are those wherein the sulfonate salt group is attached to an aromatic acid nucleus such as benzene, naphthalene, diphenyl, oxydiphenyl, sulfonyldiphenyl or methylenediphenyl nucleus. Examples of sulfomonomers include sulfophthalic acid, sulfoterephthalic acid, sulfoisophthalic acid, 5-sodiosulfoisophthalic acid, 4-sulfonaphthalene-2,7- dicarboxylic acid, and their esters. Metallosulfoaryl sulfonate which is described in U.S. Pat. No. 3,779,993, and is incorporated herein by reference, may also be used as a sulfomonomer.

The sulfomonomer is present in an amount to provide water-dispersibility to the sulfo-polyester. Preferably, the sulfomonomer is present in an amount of from 5 to 40 mole percent, more preferably 15 to 25 mole percent, based on the sum of the moles of total dicarboxylic acid content.

The diol component of the polyester consists of at least 35 mole percent of a diol selected from ethylene glycol, diethylene glycol, propane-1,2-diol, 1,4-cyclohexanedimethanol and 2,2-dimethyl-1,3-propanediol. The diol component may also include mixtures of the above diols. In addition, the diol component may include up to 65 mole percent of other cycloaliphatic diols preferably having 6 to 20 carbon atoms or aliphatic diols preferably having 3 to 20 carbon atoms. Included within the class of aliphatic diols are aliphatic diols having ether linkages such as polydiols having 4 to 800 carbon atoms. Examples of additional diols are: diethylene glycol, triethylene glycol, propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, and 2,2-bis-(4-hydroxypropoxyphenyl)-propane. The diol component of the polyester may contain at least 95 mole percent of a diol selected from ethylene glycol, propane-1,2-diol, propane-1,3-diol, 1, 4-cyclohexanedimethanol and 2,2-dimethyl-1,3-propanediol.

The particular combination of diols is stipulated only by the requirements that the final product possess a Tg equal to or greater than 89° C. while maintaining water-dispersibility. Semi-crystalline and amorphous materials are within the scope of the present invention. It is to be understood that the sulfo-polyesters of this invention contain substantially equal molar proportions of acid equivalents (100 mole %) to hydroxy equivalents (100 mole %). Thus, the sulfo-polyester comprised of components (a), (b), and (c) will have a total of acid and hydroxyl equivalents equal to 200 mole percent. The sulfo-polyesters have an inherent viscosity of 0.1 to 1.0 dl/g, preferably 0.2 to 0.6 dl/g.

A buffer is preferably added to the compositions of the present invention. Buffers and their use are well known in the art and do not require extensive discussions. Preferred buffers include sodium acetate, potassium acetate, lithium acetate, sodium phosphate monobasic, potassium phosphate dibasic and sodium carbonate. The buffer is present in an amount of up to 0.2 moles per mole of difunctional sulfomonomer. Preferably, the buffer is present in an amount of about 0.1 moles per mole of difunctional sulfomonomer.

An aspect of the present invention concerns the effect of diol chain length on the Tg of the resulting product. The structures: $HO-(OCH_2-CH_2)_n-OH$ and $HO-CH_2-(CH_2)_n-OH$ refer to the homologous series' of diols that are derived from ethylene and oxyethylene (i.e. diethylene) glycol. Values of n for the example based on ethylene glycol are normally in the range from 1 to 12. As n increases the Tg for a resulting homopolyester resin is decreased accordingly. Therefore, modification of essentially a sulfonate-containing poly(ethylene naphthalene dicarboxylate) requires proportionately smaller molar amounts of codiol as n increases. A similar trend is observed when n increases from one (diethylene glycol) to about 10 for oxyethylene glycols.

In the case of high molecular weight oxyethylene glycol, also referred to as poly(ethylene glycol) or PEG, the value of n will be at least 10, preferably about 20, which translates into a PEG monomer molecular weight of at least 500, preferably around 1000. Typically less than 5 mole percent of PEG incorporation, based on total diol, will be used since a Tg of greater than 89° C. is required. One advantage of high molecular weight PEG modification is the ability to attain higher molecular weights without losing water-dispersibility. It is important to note that high sulfomonomer levels result in high process melt viscosities which limit the molecular weight attainable in the melt phase. A low molecular weight determined by an inherent viscosity measurement of less than 0.1 dl/g may result in poor physical properties such as low Tg and inadequate tensile strength.

The sulfo-polyesters can be prepared by conventional polycondensation procedures well-known in the art. Such processes include direct condensation of the acid with the diol or by ester interchange using lower alkyl esters. For example, a typical procedure consists of two stages. The first stage, known as ester-interchange or esterification, is conducted in an inert atmosphere at a temperature of 175° C. to 240° C. for 0.5 to 8 hours, preferably 1 to 4 hours. The diols, depending on their particular reactivities and the specific experimental conditions employed, are commonly used in molar excesses of 1.05 to 2.5 per mole of naphthalene dicarboxylate.

The second stage, referred to as polycondensation, is conducted under reduced pressure at a temperature of 230° C. to 350° C., preferably 265° C. to 325° C., and more preferably 270° C. to 290° C. for 0.1 to 6 hours, preferably 0.25 to 2 hours. Because high melt viscosities are encountered in the polycondensation stage, it is sometimes advantageous to employ temperatures above 300° C. since the resulting decrease in melt viscosity allows somewhat higher molecular weights to be obtained. Stirring or appropriate conditions are employed in both stages to ensure sufficient heat transfer and surface renewal for the reaction mixture. The reactions of both stages are facilitated by appropriate catalysts which are well known in the art. Suitable catalysts include, but are not limited to, alkoxy titanium compounds, alkali metal hydroxides and alcoholates, salts of organic carboxylic acids, alkyl tin compounds and metal oxides.

The sulfo-polyesters of this invention are useful as adhesives, coating materials, sizes, laminated products, aqueous printing inks, and films. Particular utility is found in applications where increased abrasion resistance, inherent higher temperature process conditions, and improved blocking resistance are required.

The materials and testing procedures used for the results shown herein are as follows:

Glass transition temperature (Tg) was determined using a differential scanning calorimeter (DSC).

Inherent viscosity (I.V.) was measured at 23° C. using 0.50 grams of polymer per 100 ml of a solvent consisting of 60% by weight phenol and 40% by weight tetrachloroethane.

The process of the present invention will be further illustrated by a consideration of the following examples, which are intended to be exemplary of the invention. All parts and percentages in the examples are on a weight basis unless otherwise stated.

EXAMPLE 1

Sulfo-Polyester containing 22 mole % 5-sodiosulfoisophthalate

A 500 mL flask was equipped with a head having a nitrogen inlet, a sidearm to allow removal of volatile materials, and a socket joint to accommodate a stirrer. The stirrer shaft was inserted through the socket joint and has a ball joint attached by pressure tubing to the shaft, which provides a vacuum seal. The flask was charged with 95.2 grams (0.39 moles) dimethyl-2,6-naphthalene dicarboxylate, 32.6 grams (0.11 moles) dimethyl-5-sodiosulfoisophthalate, 53.0 grams (0.50 moles) diethylene glycol, 72.0 grams (0.50 moles) 1,4-cyclohexanedimethanol, 0.90 grams (0.011 moles) sodium acetate, and 0.65 mL of a 1.46% (w/v) solution of titanium(IV) isopropoxide in n-butanol. After the reactants were purged with nitrogen the flask was immersed in a Belmont metal bath preheated to 200° C. for two hours with stirring under a gentle sweep of inert gas. The temperature of the bath was raised to 215° C. and the reaction was allowed to continue for an additional two hours to complete the transesterification stage. The bath temperature was increased from 215° C. to 300° C. and the nitrogen purge was replaced with a vacuum of less than 0.5 mm Hg. The flask was heated for 15 minutes under reduced pressure at which time the viscosity of the molten material exceeded the capacity of the stirrer to provide adequate surface renewal. At this point the flask was removed from the metal bath and the vacuum was replaced with a nitrogen atmosphere. After cooling to about 25° C., the polymer was removed from the flask.

Analysis of the polymer indicated that the diol component consisted of approximately 70 mole % 1,4-cyclohexane dimethanol and approximately 30 mole % diethylene glycol. The polymer had an I.V. of 0.26 and a Tg of 120° C.

EXAMPLE 2

Sulfo-polyester containing 18 mole % 5-sodiosulfoisophthalate

The apparatus and general procedure of Example 1 were employed. Initially charged to the flask were: 100.0 grams (0.41 moles) dimethyl-2,6-naphthalene dicarboxylate, 26.6 grams (0.09 moles) dimethyl-5-sodiosulfoisophthalate, 70.0 grams (0.66 moles) diethylene glycol, 21.1 grams (0.34 moles) ethylene glycol, 0.74 grams (0.009 moles) sodium acetate, and 0.53 mL of a 1.46% (w/v) solution of titanium(IV) isopropoxide in n-butanol. The transesterification stage was conducted at 200° C. for two hours and 220° C. for two hours. Methanol was removed by distillation. The second stage, also known as the polymerization stage, was conducted at a reduced pressure of 0.5 to 0.05 mm of Hg and a temperature of 280° C. for a time period of approximately 25 minutes.

Analysis of the polymer indicated that the diol component consisted of approximately 60 mole % diethylene glycol and 40 mole % ethylene glycol. The polymer had an I.V. of 0.30 and a Tg of 90° C.

EXAMPLES 3 and 4

Examples 3 and 4 employ the procedure and apparatus described in Examples 1 and 2. The diol composition in both examples was 100 mole percent of diethylene glycol. The level of 5-sodiosulfoisophthalate was 10 and 19 mole percent, respectively. The results are summarized in Table I.

The results illustrate that diethylene glycol alone as the diol component does not produce a sulfo-polyester with a Tg of greater than 89° C. Moreover, doubling the level of sulfomonomer only increased the Tg by 4° C.

EXAMPLES 5 and 6

Effect of Buffer on Composition

Two polyesters containing 18 and 20 mole % 5-sodiosulfoisophthalate, respectively, and ethylene glycol were prepared as described above. Example 5 was prepared without a buffer. Example VI was prepared containing 0.1 moles of sodium acetate per mole of 5-sodiosulfoisophthalate. The diol composition for Example 5 was 97 mole % ethylene glycol and 3 mole % diethylene glycol. The diol composition for Example 6 was 52 mole % ethylene glycol, 34 mole % diethylene glycol, and 14 mole % triethylene glycol. The Tg values for these resins was 129° C. and 90° C., respectively.

EXAMPLES 7-9

Effect of PEG Incorporation on IV and Tg

Three sulfo-polyesters containing 18–19 mole % 5-sodiosulfoisophthalate and more than 90 mole % ethylene glycol were prepared as described above. The examples differed in the amount of incorporated poly(ethylene glycol), which was 1, 2, and 3 mole %, respectively. The test results are summarized in Table I.

The I.V. of the polymers was determined to be 0.21, 0.23 and 0.25, respectively. A decrease in Tg from 115°

C. to 92° C. was observed as the level of PEG increased from 1 to 3 mole %.

EXAMPLES 10-21

Effect of Diol Comonomers on Tg

Examples 10–13 illustrate how incorporation of 1,4-cyclohexane dimethanol and ethylene glycol increase the Tg of a diethylene glycol based polymer. Examples 14–17 demonstrate that certain comonomers do not significantly change the Tg, but change the water-dispersibility property of the polymers. Examples 18–22 show the effect of increasing the length of a low molecular weight diol component on the Tg.

EXAMPLES 23 and 24

Varying the Dicarboxylic Acid Component

Examples 23 and 24 substitute naphthalene dicarboxylic acid with isophthalic acid and terephthalic acid, respectively. The results are summarized in Table I.

Table I clearly shows that a glass transition temperature of greater than 89° C. for a sulfo-polyester can only be obtained by using naphthalene dicarboxylic acid or naphthalene dicarboxylate ester, a sulfomonomer and at least 35 mole percent of a diol selected from ethylene glycol, 1,4-cyclohexanedimethanol, propane-1,2-diol, and 2,2-dimethyl-1,3-propanediol.

TABLE I

Water-Dispersible Sulfo-polyesters Based on Naphthalene Dicarboxylate

| Ex. N° | Diol Composition (mole %) | | SIP Content (mole %) | I.V. | Water Solubility (wt %) | Tg (°C.) |
|---|---|---|---|---|---|---|
| 3 | DEG | (100) | 10 | 0.50 | 20 | 66 |
| 4 | DEG | (100) | 19 | 0.34 | 20 | 70 |
| 5 | EG | (97) | 18 | 0.20 | 20 | 129 |
|   | DEG | (3) | | | | |
| 6 | EG | (52) | 20 | 0.27 | 30 | 90 |
|   | DEG | (34) | | | | |
|   | TEG | (14) | | | | |
| 7 | EG | (93) | 18 | 0.21 | 20 | 115 |
|   | DEG | (6) | | | | |
|   | PEG1000 | (1) | | | | |
| 8 | EG | (92) | 19 | 0.23 | 15 | 107 |
|   | DEG | (6) | | | | |
|   | PEG1000 | (2) | | | | |
| 9 | EG | (92) | 18 | 0.25 | 20 | 92 |
|   | DEG | (5) | | | | |
|   | PEG1000 | (3) | | | | |
| 10 | DEG | (52) | 24 | 0.29 | 30 | 104 |
|    | CHDM | (48) | | | | |
| 11 | DEG | (21) | 20 | 0.25 | 15 | 118 |
|    | CHDM | (79) | | | | |
| 12 | DEG | (61) | 19 | 0.23 | 30 | 92 |
|    | EG | (39) | | | | |
| 13 | DEG | (15) | 24 | 0.20 | 15 | 122 |
|    | CHDM | (85) | | | | |
| 14 | EG | (76) | 19 | 0.20 | 20 | 127 |
|    | CHDM | (19) | | | | |
|    | DEG | (5) | | | | |
| 15 | EG | (61) | 20 | 0.23 | 15 | 131 |
|    | DEG | (4) | | | | |
|    | CHDM | (35) | | | | |
| 16 | EG | (62) | 18 | 0.29 | 20 | 123 |
|    | DEG | (3) | | | | |
|    | NPG | (35) | | | | |
| 17 | EG | (36) | 19 | 0.26 | 20 | 118 |
|    | DEG | (2) | | | | |
|    | NPG | (62) | | | | |
| 18 | EG | (57) | 20 | 0.22 | 30 | 91 |
|    | DEG | (4) | | | | |
|    | HD | (39) | | | | |
| 19 | EG | (27) | 20 | 0.29 | 25 | 71 |
|    | DEG | (2) | | | | |
| 20 | HD | (71) | 17 | 0.16 | slight | 74 |
|    | BD | (>99) | | | | |
| 21 | EG | (64) | 20 | 0.20 | 30 | 91 |
|    | DEG | (26) | | | | |
|    | TEG | (10) | | | | |
| 22 | EG | (60) | 18 | 0.23 | Not Determined | 101 |
|    | DEG | (40) | | | | |
| 23[a] | EG | (95) | 22 | 0.22 | 30 | 75 |
|    | DEG | (5) | | | | |
| 24[b] | EG | (95) | 23 | 0.20 | 30 | 78 |
|    | DEG | (5) | | | | |

[a]Contains 100 mole % of isophthalate units.
[b]Contains 100 mole % of terephthalate units.
KEY TO ABBREVIATIONS:
EG = ethylene glycol
DEG = diethylene glycol
TEG = triethylene glycol
NPG = neopentyl glycol
BD = 1,4-butanediol
HD = 1,6-hexanediol
CHDM = 1,4-cyclohexane dimethanol
PEG1000 = poly(ethylene glycol); MW is 1000 g/mole
SIP = 5-sodiosulfoisophthalate Many variations will suggest themselves to those skilled in this art in light of the above detailed description. All such obvious modifications are within the full intended scope of the appended claims.

What is claimed is:

1. A water-dispersible sulfo-polyester having a glass transition temperature of greater than 89° C. consisting essentially of repeat units from:
   (a) a dicarboxylic acid selected from the group consisting of naphthalene-2,6-dicarboxylic acid, naphthalene-2,7-dicarboxylic acid, naphthalene-2,6-dicarboxylate ester and naphthalene-2,7-dicarboxylate ester;
   (b) a diol selected from the group consisting of ethylene glycol, 1,4-cyclohexanedimethanol, propane-1,2-diol, and 2,2-dimethyl-1,3-propanediol, and mixtures thereof; and
   (c) a difunctional sulfomonomer containing at least one sulfonate group attached to an aromatic nucleus wherein the functional groups are hydroxy, carboxy or amino, provided the difunctional sulfomonomer is present in an amount from 15 to 25 mole percent based on 100 mole percent dicarboxylic acid and 100 mole percent diol.

2. The sulfo-polyester of claim 1 wherein the sulfo-polyester is prepared using a buffer in an amount of 0.001 to 0.2 moles per mole of difunctional sulfomonomer.

3. The sulfo-polyester of claim 2 wherein the buffer is present in an amount of about 0.1 moles per mole of difunctional sulfomonomer.

4. The sulfo-polyester of claim 2 wherein the buffer is selected from the group consisting of sodium acetate, potassium acetate, lithium acetate, sodium phosphate monobasic, potassium phosphate dibasic and sodium carbonate.

5. The sulfo-polyester of claim 4 wherein the buffer is sodium acetate.

6. The sulfo-polyester of claim 1 wherein the difunctional sulfomonomer component is selected from the group consisting of sulfophthalic acid, sulfoterephthalic acid, sulfoisophthalic acid, 4-sulfonaphthalene-2,7-dicarboxylic acid, and esters thereof.

7. The sulfo-polyester of claim 6 wherein the difunctional sulfomonomer component is 5-sodiosulfoisophthalic acid.

* * * * *